Dec. 19, 1944. M. P. ROBINSON 2,365,293
WATER TREATING APPARATUS
Filed April 25, 1941 3 Sheets-Sheet 1

Merrill P. Robinson,
INVENTOR
BY *Rob...*
ATTORNEY

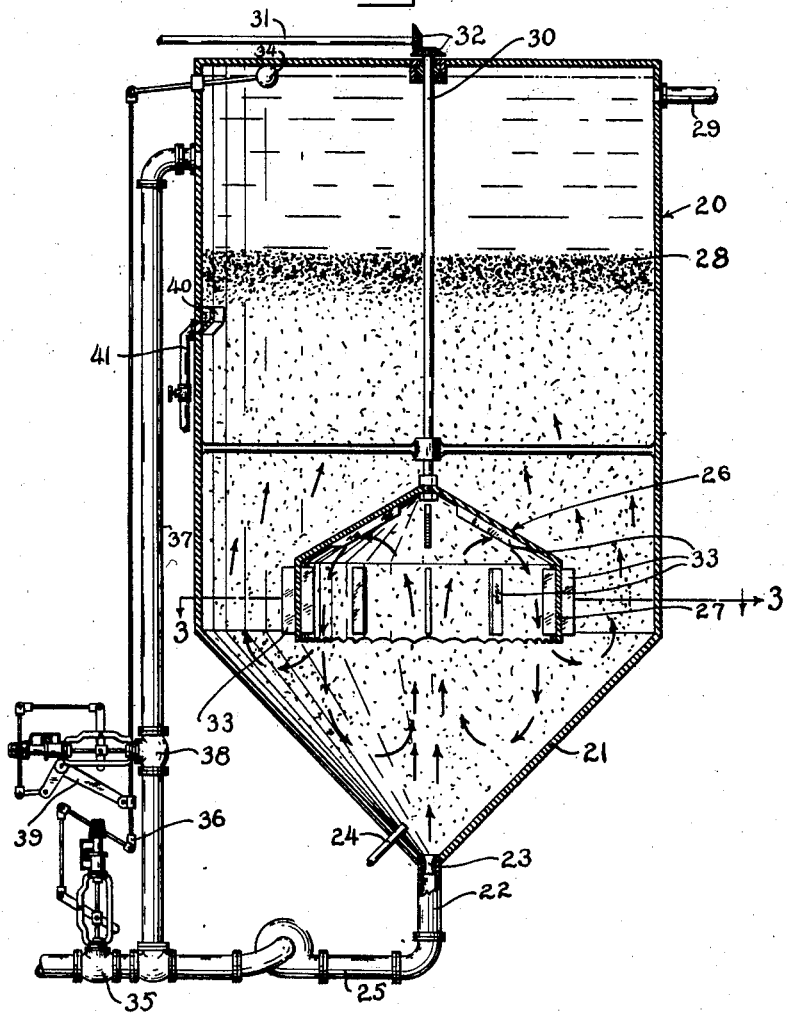
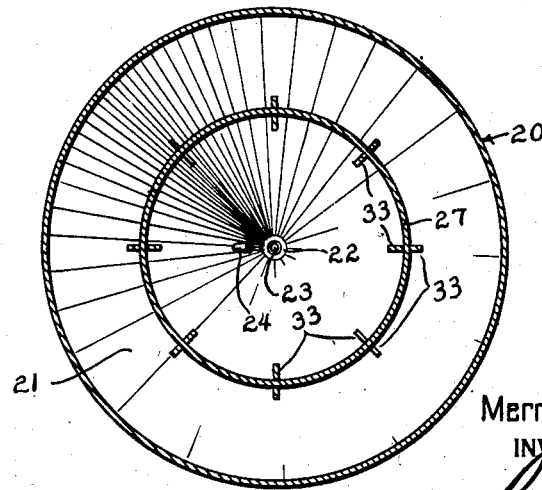

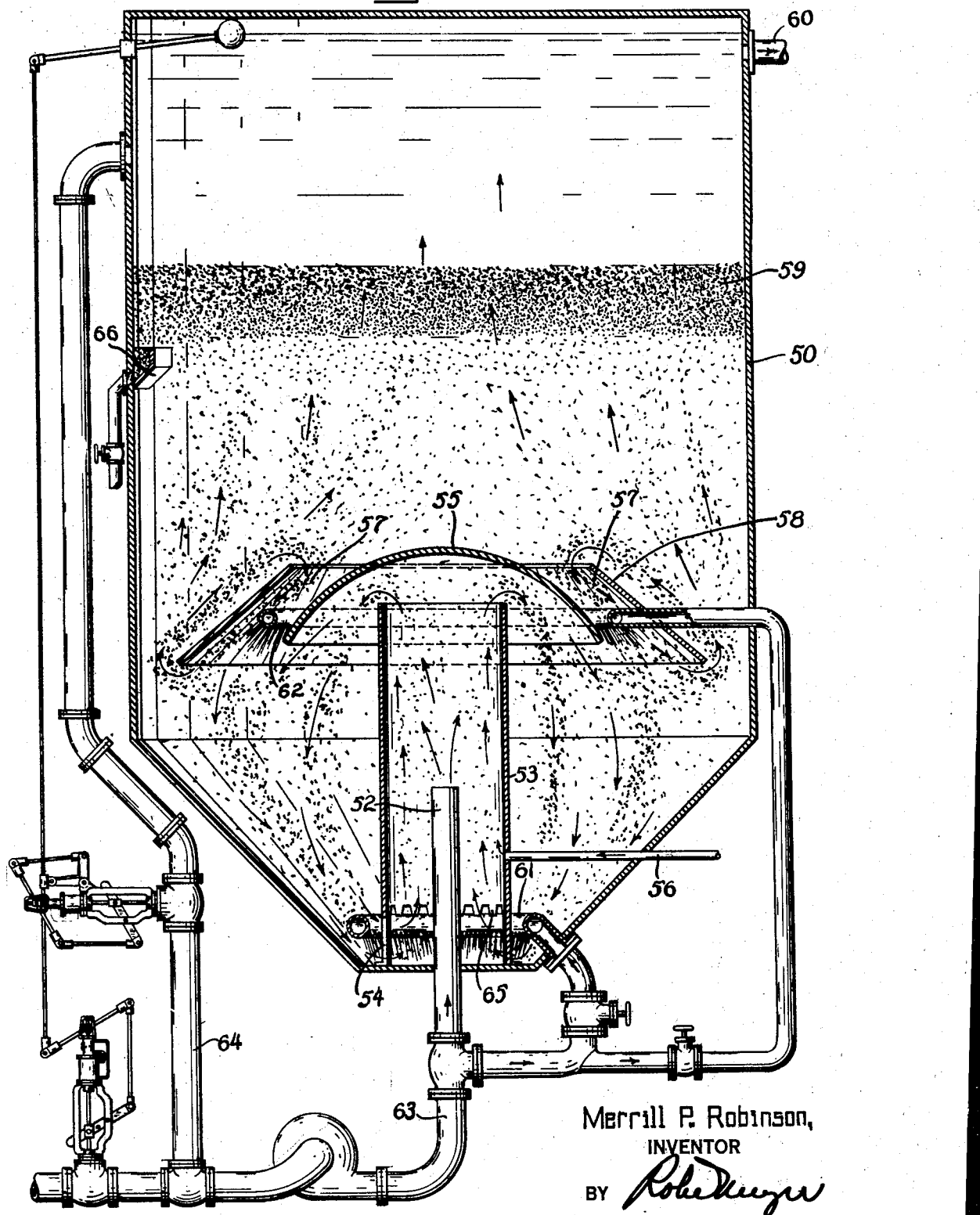

UNITED STATES PATENT OFFICE 2,365,293

WATER TREATING APPARATUS

Merrill P. Robinson, Upper Montclair, N. J., assignor to Worthington Pump and Machinery Corporation, Harrison, N. J., a corporation of Delaware Application April 25, 1941, Serial No. 390,238

19 Claims. (Cl. 210—16)

This invention relates to water treating apparatus, and more particularly to a percolating coagulator for recirculating chemical floc and producing slurry which acts as a contact filter for coagulating, softening and clarifying water.

The present invention embodies the advantages of the known fact that to add raw water and chemicals to a slurry containing previously precipitated particles improves and accelerates coagulation and purification of the water and accelerates the chemical and physical changes involved in separating out the formed substances or solids. The newly formed solids deposit by accretion on the particles present in the slurry rather than separating out as new small particles. These particles are relatively stable, being not readily subject to disintegration and of such nature that clear, treated water is readily separated from the slurry.

An object of the present invention is to provide an apparatus operating on the principle above outlined which is simple in construction with consequent economy of material and costs of construction and provides continuous separation of clarified, treated water over the entire area of the slurry bed at a rate equal to the supply of raw water to the apparatus, thereby permitting clarification and treatment of a maximum amount of water in a minimum of space required for the treating apparatus.

The present apparatus utilizes the pressure and velocity of the incoming raw water as a motivating medium for recirculating a mixture of the slurry, water and chemicals to hasten flocculation and the formation of slurry accumulations in a filter bed above the recirculating zone in the apparatus.

For the purpose of controlling the concentration or density of slurry in the bed, a portion of the slurry is continuously taken off from the slurry bed and discharged as sludge. The purified and treated water is taken off from the apparatus from the accumulation of purified water above the slurry bed, through which it has passed.

Another object of the present invention is to provide, in a water treating apparatus as specified, means to cause and maintain uniform distribution of the slurry particles, to maintain uniform density of the slurry bed, and to provide uniform distribution of the water passing through the slurry bed, as well as to prevent short circuiting of the water flow with the resultant incomplete treatment of the water.

A further object of the invention is to provide means for maintaining a substantially constant flow of water through the apparatus, regardless of the load demand for treated water, thereby maintaining a uniform condition conducive to the maintenance of a slurry bed of optimum proportions and density.

With these and other objects in view, as may appear from the accompanying specification, the invention consists of various features of construction and combination of parts, which will be first described in connection with the accompanying drawings, showing a water treating apparatus of the preferred form embodying the invention, and the features forming the invention will be specifically pointed out in the claims.

In the drawings:

Figure 2 is a vertical section through a modified form of the apparatus.

Figure 3 is a cross-section taken on the line 3—3 of Figure 2.

Figure 4 is a vertical section through a further modified form of the apparatus.

Figure 1:
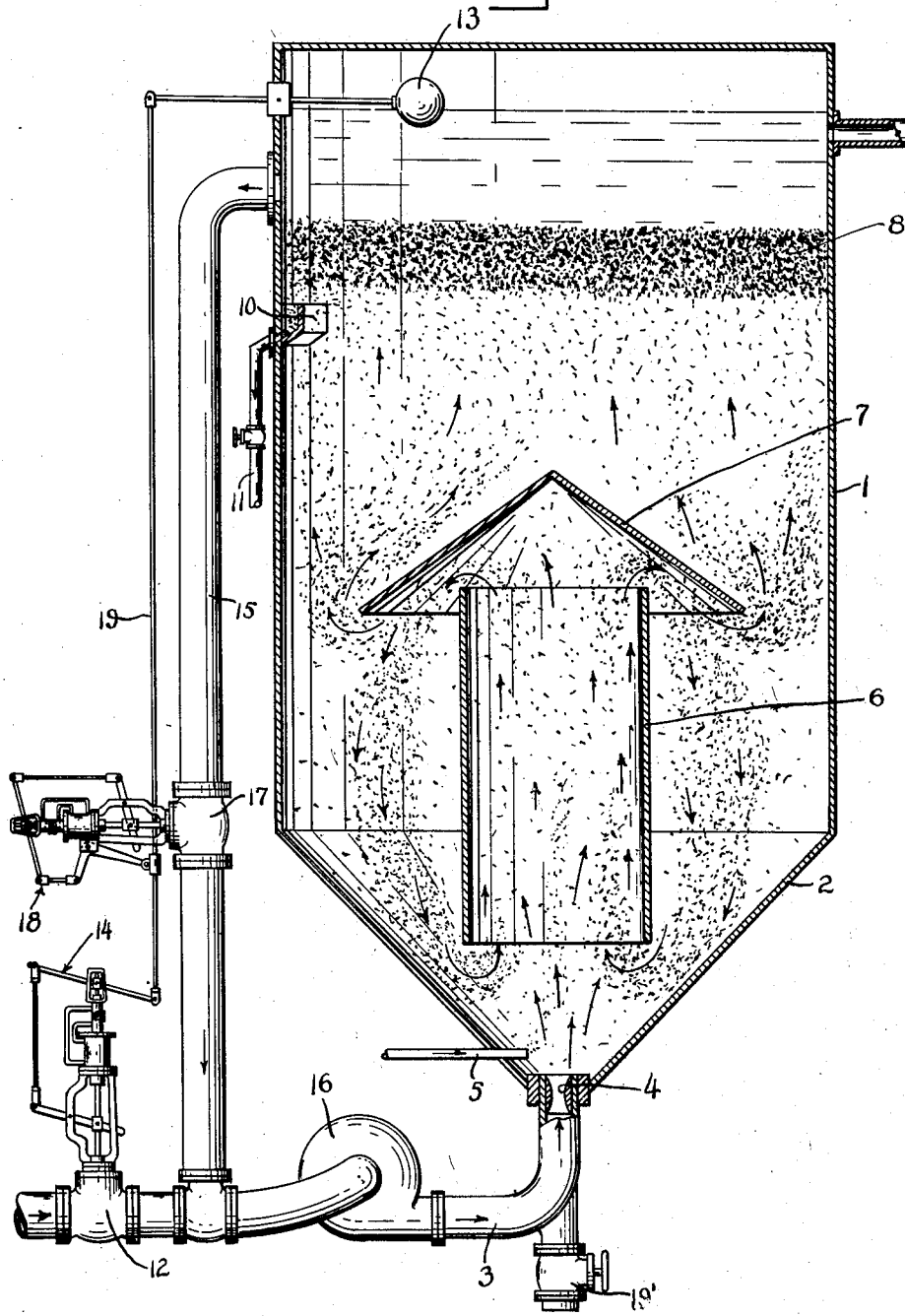
Figure 1 is a vertical section through the improved water treating apparatus.

Referring more particularly to the drawings, the improved apparatus comprises a tank 1, the bottom portion 2 of which is preferably in the shape of an inverted cone, having an inlet for raw water to be treated at its apex. The raw water to be treated enters the bottom of the tank 1 from the supply pipe 3 through an eductor nozzle 4, and is projected upwardly into the tank. The chemicals employed in the treating of the water are admitted to the tank 1 at a suitable location through a suitable inlet pipe 5, and they mix with the water issuing from the eductor tube or nozzle 4.

The water issuing from the nozzle 4 passes into and through a cylindrical flow guiding member 6, which is spaced a short distance above the outlet of the nozzle 4. A conical deflector 7 is positioned above and over the outlet end of the cylindrical flow guiding member 6, and the water passing out of the flow guiding member strikes against the inner surface of the conical deflector 7 and is deflected downwardly and outwardly, causing some of the water to flow downwardly outside of the flow directing member 6 and upon striking the inclined surface of the bottom 2 of the tank 1 to be deflected thereby and drawn upwardly into the member 6 by the action of the incoming raw water. Portions of the water, after being deflected by the conical deflector 7, will pass upwardly into the tank, as indicated by the various arrows.

The chemicals, mixing with the water in its initial flow through the member 6, will cause flocculation or separating out of the precipitated particles, forming a relatively thin slurry, portions of which will be recirculated through the member 6, with the incoming raw water, in the manner above stated. The recirculation of the slurry, or of the mixed water and precipitated particles, improves and accelerates flocculation, or the chemical and physical changes involved in forming precipitated particles of a character best suited to the process.

The tank 1 is so proportioned that when the purifier is operating to supply its full rated capacity, the upward velocity is sufficient to carry the slurry upward. However, in their upward transit the particles grow in size by reason of contact of one with another, until their effective weight halts their upward travel. Therefore, by maintaining a fairly uniform upward velocity of water, and a character of particles predetermined by agitation and the chemicals added, an accumulation of slurry is caused, to form a floating contact filter bed of a height and density best suited to the clarification of the water being purified. The purified, treated water passes through this filter bed 8 and accumulates in the top of the tank, from whence it is drawn off by the outlet 9.

A slurry deconcentrator, or device for preventing excess concentration of slurry in the bed 8, is provided, as shown at 10. This device, in the form of an outlet trough placed within the tank 1, is located a predetermined distance below the level of the top of the slurry bed 8, and has a drain outlet 11 connected thereto so that a part of the slurry will be continuously drained out of the tank from a point below the slurry bed 8, thus controlling the concentration of the slurry.

From the foregoing it will be noted that the efficient purification of the water and its recirculation to facilitate flocculation is dependent upon the quantity, pressure and velocity of the water entering the apparatus through the inlet nozzle 4, together with the maintenance of a fairly constant velocity upward through the tank. Since in the majority of installations the withdrawal of the purified water is irregular, that is, the load demand on the apparatus for purified water varies from time to time, it is necessary or advisable to provide means for controlling the quantity of raw water supplied to the apparatus in accordance with such load demand, or demand for purified water. In the present invention, such control is provided through the medium of a valve 12, placed in the supply pipe 3 for raw water. This valve 12 is actuated in accordance with the level of purified water in the tank 1 through the medium of a float 13 and suitable linkage 14. The valve 12 and its operating mechanism may be of any approved type, and in Figure 1 of the drawings a hydromatic type of water inlet regulating valve is employed. This type of valve may be purchased upon the open market, and its specific details of construction form no part of the present invention.

As the water level rises in the tank 1, in response to decreased demand for purified water, the quantity of raw water delivered to the apparatus will be decreased, with the result that such decrease in the flow of raw water to be treated will cause inefficient operation of the apparatus. The present invention overcomes such inefficiency and provides for proper treatment and purification of all of the water, regardless of the load demand and regardless of the amount of raw water being delivered to the device. The mechanism for accomplishing this consists of an overflow or recirculating pipe 15, which opens into the tank 1 above the slurry bed 8, to take purified water from the accumulation of such purified water in the tank, but below the outlet 9. The recirculating or by-pass pipe 15 delivers the purified water to the intake nozzle 4, either for mixing with whatever quantity of raw water is being fed thereto, or, if the supply of raw water is completely shut off, for maintaining a constant flow of water through the apparatus.

It may be desirable to provide a pump 16 in the line to induce flow through the circulating line 15 and to insure the proper pressure and velocity to the water being delivered into the tank 1 through the nozzle 4.

A valve 17 is interposed in the by-pass pipe 15, and is connected by a series of links or levers 18 to the float actuated rod 19, which operates the linkage mechanism of the valve 12. The linkage structure 18, however, is arranged so that it will operate the valve 17 in reverse of the operation of the valve 12. That is, the valve 17 will be opened proportionately as the valve 12 is closed. Thus a substantially constant quantity of water will be at all times delivered to the inlet of the tank 1 through the nozzle 4, and a substantially constant upward velocity through the floating contact filter bed will be maintained, regardless of the demand for purified water and regardless of the quantity of raw water being delivered to the apparatus, insuring efficient operation of the device at all times, preventing disintegration, settling out or malformation of the slurry bed, and providing a predetermined quantity of uniformly purified, treated water available at all times as the demand may require, within the capacity of the apparatus.

A suitable drain connection and valve may be provided, as shown at 19′, for removing the contents of the apparatus.

In Figures 2 and 3 of the drawings a modified form of the invention is shown, differing from the form shown in Figure 1 principally in that the water flow directing means is rotated or gyrated to provide additional agitation and uniform distribution of the slurry particles issuing from the water flow directing means, resulting in uniform density of the slurry bed and thereby preventing short circuiting of the water flow through the slurry bed and insuring proper treatment of the water.

In this form of the invention the tank 20 has a bottom 21 in the form of an inverted cone, having the inlet 22 for raw water to be treated at the apex and in the form of an eductor nozzle, as indicated at 23. The chemicals employed in treating the water are admitted into the tank 20 at any suitable point, as indicated at 24. The incoming raw water, delivered to the nozzle 23 through the supply pipe 25, passes upwardly in the tank 1 into the conical deflector 26, which latter may have a part of its outer surface in the form of a cylinder, as shown at 27, if desired. The deflector 26 forms the means for guiding and directing the flow of the water and chemicals. The water and mixed chemical, striking the inner surface of the conical portion of the deflector 26, is directed downwardly, as indicated by the various arrows, and part of it follows a substantially oval pattern, being recirculated up into and out of the member 26 with the incoming raw water, while a part of it passes around the lower edge of the deflector 26 and passes upwardly in the tank 20 towards its top.

Flocculation or separating out of the precipitated particles is accelerated by the recirculation, and the newly formed precipitated particles in the incoming raw water deposit by accretion on the previously formed precipitated particles being recirculated, thus facilitating the purification of the water. The precipitated particles or solids forming the slurry accumulation above the top of the deflector 26, or the slurry bed 28, acts as a filter through which the purified, treated water passes on its way to the top of the tank 1, from whence it is withdrawn for use, through the outlet 29.

The deflector 26 is agitated, or, as shown in the drawings, rotated slowly within the tank to provide additional agitation and to facilitate circulation of the slurry and water and also to cause uniform distribution of the slurry particles within the tank, resulting in uniform density of the slurry bed 28. The deflector 26 may be rotated in any suitable manner, such as by shafts 30 and 31 and the gear 32. The shaft 31 is rotated from any suitable source of power (not shown). If so desired, the deflector 26 may have radially extending blades 33 on its inner and outer surfaces, facilitating agitation of the water and slurry.

The supply of raw water to the apparatus is controlled in accordance with the demand for purified, treated water, through the medium of a float 34, a valve 35 placed in the supply line 25, and suitable linkage structure 36, so that as the water level rises in the tank 20, the quantity of raw water being supplied will be proportionately decreased, and vice versa. For the purpose of maintaining a substantially constant flow of water through the apparatus for insuring efficient treatment of all water passing therethrough, a by-pass pipe 37 is provided which opens into the tank 20 above the level of the slurry bed 28 and below the outlet 29, which pipe 37 opens into the supply line 25. A valve 38 is interposed in this by-pass line 37 and operation of this valve is controlled through links or levers 39 by the float 34 so that the valve 38 is opened in direct proportion to the closing of the valve 35, and inversely, is closed in proportion to the opening of the valve 35, thereby providing for a substantially constant supply of water to the eductor nozzle 23 and maintaining a constant quantity of water through the apparatus.

A slurry deconcentrator or outlet 40, which has an overflow pipe 41 connected thereto, is located within the tank 20, below the normal level of the slurry bed 28, to provide a continuous drain off of slurry, maintaining the proper depth of the slurry bed 28.

Figure 4 of the drawings shows a still further modified form of the invention, operating on the same principle and in the same manner in which the constructions previously described operate, differing therefrom primarily in the water flow details. In this form, shown in Figure 4, the tank 50 has its bottom in the form of an inverted, truncated cone. The eductor or inlet nozzle 52 for the raw water extends upwardly into the cylindrical flow guiding member 53, which latter has its bottom portion open, as shown at 54, so that the raw water and the precipitated particles separated out from the initial inflow of raw water, will be deflected downwardly by the deflector 55 and picked up by the inductor action of the inlet tube, will be recirculated through the flow guiding member 53. Chemicals for treating the water are added at any suitable point through an inlet pipe 56.

Part of the slurry, or water and precipitated particles or solids, deflected by the member 55, pass upwardly about the edges of the deflector toward the top of the tank. During such passage, a portion of this flow is drawn by the suction action of the eductor passages 57, formed between the outer surface of the deflector 55 and the inner surface of the circulating, eddy-forming member 58 placed outside of the deflector 55, and is recirculated in short circuits or eddies about the outer surface of the member 58. Part of the water and separated solids pass out of this eddy current and upwardly toward the top of the tank, where the precipitated particles accumulate in the slurry bed 59, through which the purified, treated water passes into the accumulation space at the top of the tank, from whence it is withdrawn through the outlets 60.

The form of apparatus shown in this Figure 4 is provided with the recirculating by-pass, its control, and with the control for the supply of raw water to the apparatus, the same as in the structures shown in Figures 1 to 3 inclusive, such have been hereinabove described in connection with such figures.

For the purpose of preventing an accumulation of slurry at the recirculating entrance to the flow guiding member 53, and within the eductor passages 57 formed between the member 58 and the deflector 55, means are provided in the form of spray pipes 61 and 62, spraying water under pressure into the apparatus at these points. The spray rings or members 61 and 62 are connected to the supply line 63 inwardly of the connection of the by-pass pipe 64 with such supply line so that there will be at all times a flow of flushing water through the spray members 61 and 62. If it is so desired, the bottom of the flow guiding member 53, upwardly of the recirculating inlet openings 54, may be serrated, as shown at 65, so as to facilitate breaking up of slurry formations in the water flowing into the flow guiding member 53.

A suitable slurry deconcentrator, indicated at 66, is provided, which operates in the same manner as the slurry deconcentrators shown and described in the forms of the invention illustrated in Figures 1 to 3 of the drawings.

From the foregoing, taken in connection with the accompanying drawings, it will be apparent that in the operation of the water treating apparatus forming the present invention the various flow paths set up in the apparatus through application of recirculation and eddy circulation principles will bring the raw water in contact with the slurry through a maximum distance of continuous flow contact, resulting in many distinct advantages in an apparatus of this kind, among which are the continuous, rapid recirculation of chemical, impregnated slurry and water with positive mixing, accelerating flocculation and permitting purification of a maximum quantity of water in an apparatus of minimum size, and preventing any active chemicals from settling or passing out to waste; positive mixing and recirculating of water and slurry together with control of water delivery to the apparatus to provide a substantially constant flow through a substantially constant depth slurry bed, permitting no opportunity for incomplete reactions or for by-passing incompletely treated water; the by-pass feature, permitting complete and efficient operation of the device without requiring that the apparatus be operated at or even close to its rated capacity, but rather permitting complete and efficient treatment of the water when the apparatus is operated at a very low percentage of its rated capacity; the cost of the apparatus is considerably reduced and its construction materially simplified by the utilization of the pressure and velocity of the incoming raw water as the motivating element for providing the desired circulation within the apparatus.

It will be understood that the invention is not to be limited to the specific construction or arrangement of parts shown, but that they may be widely modified within the invention defined by the claims.

What is claimed is:

1. In a water treating apparatus, a treating tank including an outlet for treated water and a chemical inlet, means for introducing raw water into the tank, water circulation guiding means through which the entering raw water passes, said means constructed and arranged to cause a recirculation of part of the water together with slurry therethrough, and means controlled by variances in the level of clarified treated water in the tank for maintaining the flow of water through the apparatus substantially constant irrespective of the quantity of treated water withdrawn from the tank, said last named means including means for returning treated water from the tank to said raw water introducing means.

2. In a water treating apparatus a treating tank including an outlet for treated water and having a chemical inlet, means for introducing raw water into the tank, water circulation guiding means through which the entering raw water passes, said means constructed and arranged to cause a recirculation of a part of the water together with slurry therethrough, a float operated by variances in the level of treated water in the tank, means operated by said float for regulating the supply of raw untreated water to the apparatus, and means for returning treated water from said tank to said raw water introducing means, and means operated by said float for controlling the return of treated water to the raw water introducing means.

3. In a water treating apparatus, a treating tank including an outlet for treated water and a chemical inlet, means for introducing raw water into the tank, water circulation guiding means through which the entering raw water passes, said means constructed and arranged to cause a recirculation of part of the water together with slurry therethrough, means actuated by variances in the level of treated water in the tank for regulating the supply of raw untreated water to the apparatus, and means for maintaining the flow of water through the apparatus substantially constant irrespective of the quantity of treated water withdrawn from the tank said last named means including means for returning treated water from the tank to said raw water introducing means.

4. In a water treating apparatus, a treating tank including an outlet for treated water and a chemical inlet, means for introducing raw water into the tank, water circulation guiding means through which the entering raw water passes, said means constructed and arranged to cause a recirculation of part of the water together with slurry therethrough, said tank having a treated water outlet above said circulation guiding means, the slurry formed in said tank by the operation of the apparatus acting to form a filtering slurry bed between said circulation guiding means and said treated water outlet, means actuated by variances in the level of treated water in the tank for regulating the supply of raw untreated water to the apparatus, and means operated in unison with said raw water controlling means for maintaining the flow of water through the apparatus substantially constant irrespective of the quantity of treated water withdrawn from the tank, said last named means including means for returning treated water from the tank to said raw water introducing means.

5. In a water treating apparatus, a treating tank including an outlet for treated water and a chemical inlet, means for introducing raw water into the tank, water circulation guiding means through which the entering raw water passes, said means constructed and arranged to cause a recirculation of part of the water together with slurry therethrough, said tank having a treated water outlet above said circulation guiding means, the slurry formed in said tank by the operation of the apparatus acting to form a filtering slurry bed between said circulation guiding means and said treated water outlet, means controlled by variation of the level of clarified treated water in the tank for maintaining the flow of water through the apparatus substantially constant irrespective of the quantity of treated water withdrawn from the tank said last named means including means for returning treated water from the tank to said raw water introducing means, and means located a predetermined distance below the normal level of the slurry bed for withdrawing slurry from the tank to maintain predetermined thickness of the slurry bed.

6. In a water treating apparatus, a treating tank including an outlet for treated water and a chemical inlet, means for introducing raw water into the tank, water circulation guiding means through which the entering raw water passes, said means constructed and arranged to cause a recirculation of part of the water together with slurry therethrough, said tank having a treated water outlet above said circulation guiding means, the slurry formed in said tank being adapted to form a filtering slurry bed between said circulation guiding means and said treated water outlet, means controlled by variances of the level of treated water in the tank for regulating the supply of raw untreated water to the apparatus, means operated in unison with said raw water controlling means for maintaining the flow of water through the apparatus substantially constant irrespective of the quantity of treated water withdrawn from the tank, said last named means including means for returning treated water from the tank to said raw water introducing means, means located a predetermined distance below the normal level of the slurry bed for withdrawing slurry from the tank to maintain a predetermined thickness of the slurry bed, and means for moving said circulation guiding means to maintain uniform distribution of slurry in the tank.

7. In a water treating apparatus, a treating tank having an inlet for raw water to be treated and an inlet for chemicals, an inverted conical member in said tank in the path of the incoming raw water whereby the water will be projected into the conical member and deflected in its flow path to cause recirculation of the water, means for moving said conical member to cause uniform distribution of slurry particles formed in the tank, and means controlled by the level of clarified treated water in the tank for maintaining the flow of water through the apparatus substantially constant irrespective of the quantity of treated water withdrawn from the tank, said last named means including means for returning treated water from the tank to said inlet for raw water.

8. In a water treating apparatus, a treating tank having an inlet for raw water and an inlet for chemicals, an inverted conical member in said tank in the path of the incoming raw water whereby the water will be projected into the conical member and deflected in its flow path to cause recirculation of the water, means for moving said conical member to cause uniform distribution of slurry particles formed in the tank, means controlled by variances in the level of treated water in the tank for regulating the supply of raw untreated water delivered to the apparatus, means for by-passing a part of the clarified, treated water back to the raw water inlet of the apparatus, and means operated in unison with said raw water supply control means for controlling the by-passing of treated water to the tank inlet.

9. In a water treating apparatus, a treating tank having a treated water outlet, a nozzle opening into said tank through which raw water to be treated enters the tank means for introducing chemicals into the treating tank, a water flow guiding member in the tank for directing the flow of water after it leaves the nozzle, a deflector in the tank at the outlet of said flow guiding member and in the path of the water discharged by the nozzle for changing the directional flow of the water and causing recirculation of part of the water and slurry formed in the tank through said flow guiding member, and means cooperating with said deflector to form eductor passages having their inlets opposite the discharge of the flow guiding member and their outlets outwardly of the outer edge of the deflector to set up eddy recirculation of part of the slurry particles and the water.

10. In a water treating apparatus, a treating tank having an outlet for treated water, a nozzle opening into said tank through which raw water to be treated enters the tank, a water flow guiding member in the tank for directing the flow of water after it leaves the nozzle, a deflector in the tank at the outlet of said flow guiding member and in the path of the water discharged by the nozzle for changing the directional flow of the water and causing recirculation of part of the water and slurry formed in the tank through said flow guiding member, means cooperating with said deflector to form eductor passages having their inlets opposite the discharge of the flow guiding member and their outlets outwardly of the outer edge of the deflector to set up eddy recirculation of part of the slurry particles and the water, means controlled by variation in the level of treated water in said tank for regulating the supply of raw untreated water to the apparatus, means for by-passing a part of the treated water from the tank to the inlet nozzle for raw water to the tank, and means operable in unison with said raw water supply regulating means for controlling the recirculation of the treated water to maintain substantially constant the flow of water through the apparatus irrespectively of the quantity of raw water delivered to the tank.

11. In a water treating apparatus, a treating tank having an outlet for treated water and an inlet for chemicals and an inlet for raw water into the tank, water circulation guiding means through which raw water entering the tank passes, said means constructed and arranged to cause a recirculation of part of the water together with slurry therethrough, means actuated by the level of treated water in the tank for regulating the supply of raw untreated water to the apparatus, means for recirculating a part of the clarified treated water through the tank, and means actuated by said water level actuated means for controlling the quantity of recirculated water in inverse proportion to the quantity of raw water delivered to the tank.

12. In a water treating apparatus, a treating tank in a part of which treated water accumulates, said tank having an inlet for chemicals and a raw water inlet and an outlet for treated water, a supply pipe leading to said raw water inlet, a by-pass pipe having its inlet connected to the portion of the tank where the clarified treated water accumulates and its outlet connected to said raw water supply pipe for recirculating a part of the treated water through the tank, and means actuated by the level of treated water in the tank for controlling the quantity of recirculated treated water passing to the tank through said by-pass pipe in inverse proportion to the quantity of raw water delivered to the tank.

13. In a water treating apparatus, a treating tank in a part of which treated water accumulates, said tank having an inlet for chemicals and a raw water inlet and an outlet for treated water, a supply pipe leading to said raw water inlet, a by-pass pipe having its inlet connected to the portion of the tank where the clarified treated water accumulates and its outlet connected to said raw water supply pipe for recirculating a part of the treated water through the tank, valves in said raw water supply pipe and said recirculating by-pass pipe, and valve actuating means actuated by variation of the level of treated water in the tank for operating said valves.

14. In a water treating apparatus, a treating tank in a part of which treated water accumulates, said tank having an inlet for chemicals and a raw water inlet and an outlet for treated water, a supply pipe leading to said raw water inlet, a by-pass pipe having its inlet connected to the portion of the tank where the clarified treated water accumulates and its outlet connected to said raw water supply pipe for recirculating a part of the treated water through the tank, valves in said raw water supply pipe and said recirculating by-pass pipe, valve actuating means actuated by variation of the level of treated water in the tank for operating said valves, said valve actuating means connected to said valves to operate them synchronously in reverse directions whereby the quantity of recirculated treated water passing through the by-pass pipe is controlled in reverse proportion to the quantity of raw water delivered to the tank.

15. In a water treating apparatus, a treating tank in a part of which treated water accumulates, said tank having an inlet for chemicals and a raw water inlet and an outlet for treated water, a supply pipe leading to said raw water inlet, a by-pass pipe having its inlet connected to the portion of the tank where the clarified treated water accumulates and its outlet connected to said raw water supply pipe for recirculating a part of the treated water through the tank, means actuated by the level of treated water in the tank for controlling the quantity of recirculated treated water passing to the tank through said by-pass pipe in inverse proportion to the quantity of raw water delivered to the tank, water circulation guiding means in said tank through which the raw water entering the tank passes, said guiding means constructed and arranged to cause a recirculation of part of the water together with slurry therethrough.

16. In a water treating apparatus, a treating tank including an inlet for chemicals and a raw water inlet, a raw water supply pipe connected to said raw water inlet and an outlet for treated water, water circulation guiding means through which raw water entering the tank passes, said means constructed and arranged to cause a recirculation of the water together with slurry therethrough, means for moving said circulation guiding means to maintain uniform distribution of slurry in the tank, a by-pass pipe having its inlet connected to the tank for receiving treated water from the tank and its outlet connected to the tank below said water circulation guiding means, a valve in said by-pass pipe, and means actuated by the variation of the level of treated water in the tank for operating said valve.

17. In a water treating apparatus, a treating tank including an inlet for chemicals and a raw water inlet, a raw water supply pipe connected to said raw water inlet and an outlet for treated water, water circulation guiding means through which raw water entering the tank passes, said means constructed and arranged to cause a recirculation of the water together with slurry therethrough, means for moving said circulation guiding means to maintain uniform distribution of slurry in the tank, a by-pass pipe having its inlet connected to the tank for receiving treated water from the tank and its outlet connected to the tank below said water circulation guiding means, a valve in said by-pass pipe, a valve in said raw water supply pipe, valve operating means actuated by variation of the level of treated water in the tank and connected to said valves to operate them synchronously in reverse directions whereby the quantity of recirculated water passing through the by-pass pipe is regulated in inverse proportion to the quantity of raw water delivered to the tank.

18. In a water treating apparatus a treating tank in a part of which treated water accumulates, said tank having an inlet for chemicals and a raw water inlet and an outlet for treated water, a supply pipe leading to said raw water inlet, a bypass pipe having its inlet connected to the portion of the tank where the clarified treated water accumulates and its outlet connected to said raw water supply pipe for recirculation of a part of the treated water through the tank, and means actuated by the variances in the level of treated water in the tank for controlling the quantity of treated water recirculated in inverse proportion to the quantity of raw water delivered to the tank.

19. In a water treating apparatus, a treating tank in a part of which treated water accumulates, said tank having an inlet for chemicals, and an outlet for treated water, a pump for delivering raw water to the apparatus, a bypass pipe having its inlet connected to the portion of the tank where the clarified treated water accumulates and its outlet connected to the suction of said pump whereby a part of the clarified treated water will be recirculated through the tank, a valve in said bypass, and a float in said tank and actuated by variances in the level of treated water in the tank for operating said valve.

MERRILL P. ROBINSON.